United States Patent [19]
Lipton

[11] Patent Number: 5,940,581
[45] Date of Patent: *Aug. 17, 1999

[54] DYNAMIC FONT MANAGEMENT FOR LARGE CHARACTER SETS

[75] Inventor: Daniel I. Lipton, San Francisco, Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/619,238

[22] Filed: Mar. 21, 1996

[51] Int. Cl.⁶ .................................................. G06K 15/00
[52] U.S. Cl. ........................................ 395/110; 395/115
[58] Field of Search ..................................... 395/110, 112, 395/114, 115, 116, 520, 521, 526; 358/404, 444, 470, 261.4; 400/61, 62, 67, 70, 76

[56] References Cited

U.S. PATENT DOCUMENTS 5,337,258  8/1994  Dennis ................................. 345/551.01

*Primary Examiner*—Arthur G. Evans
*Attorney, Agent, or Firm*—Burns, Doane, Swecker & Mathis, L.L.P.

[57] ABSTRACT

When a document imaging operation commences, a document is examined to detect each font, and each glyph of a font, appearing in the document. If all of the detected fonts are currently stored in an imaging device, the document is sent to the device. If one or more detected fonts is not stored in the device, the detected glyphs of that font are mapped to a sparse font set. The device is queried to determine whether it can store the sparse font set. If it can, the sparse font set is downloaded to the device. If the device cannot store the sparse font set, the document is converted into a bit-mapped image, which is then imaged.

31 Claims, 4 Drawing Sheets

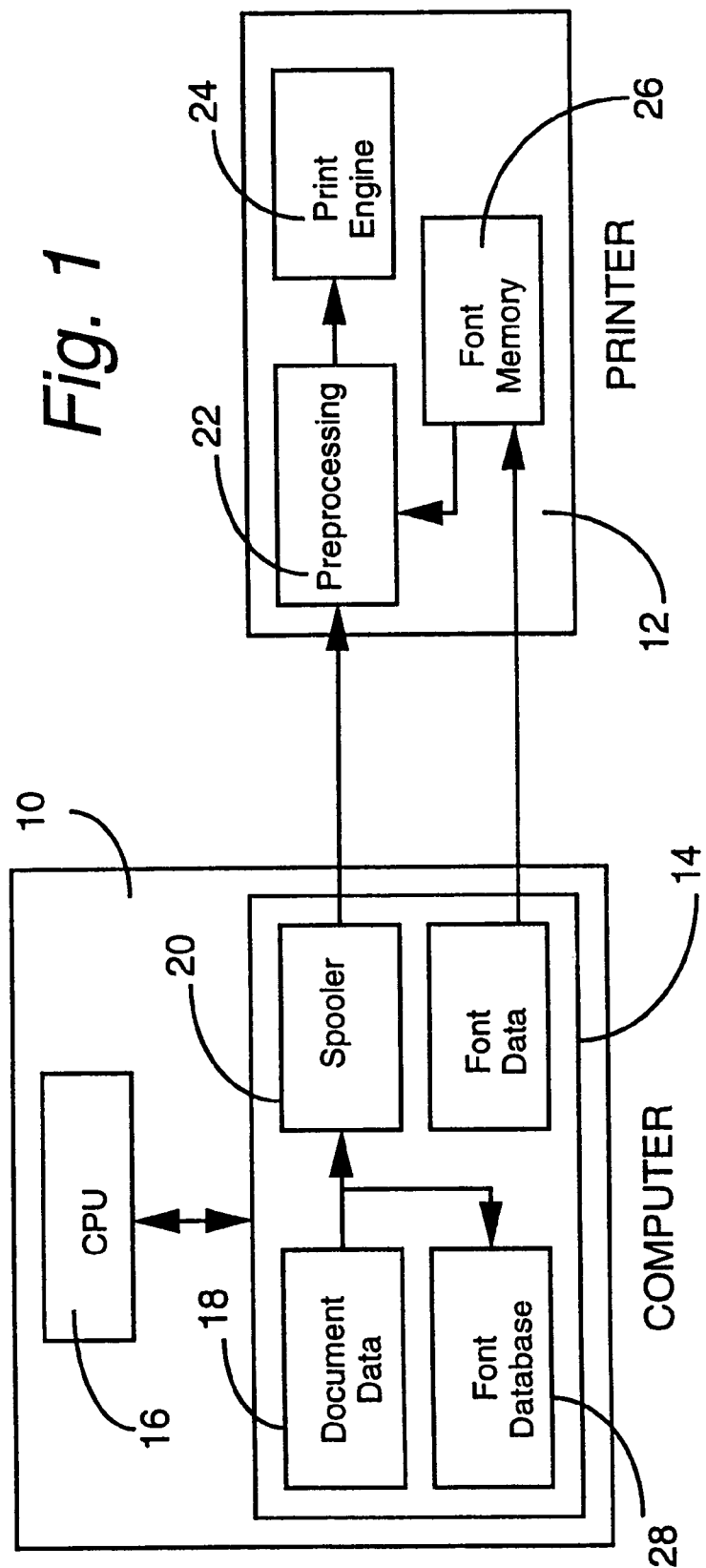

Collection:

tag = 0x00000028, id = 0; tag = 0x00000037, id = 78

Font Database packed array first page = 1, font info for Helvetica.... Glyph Usage for Helvetica.....first page = 3, font info for Chicago... glyph usage for Chicago 78 bytes

DYNAMIC FONT MANAGEMENT FOR LARGE CHARACTER SETS

FIELD OF THE INVENTION

The present invention is directed to the imaging of documents, such as printing, and more particularly to the management of fonts in an imaging device to enable fonts with large character sets to be efficiently imaged.

BACKGROUND OF THE INVENTION

Many printers offer the ability to print documents with a large variety of text fonts. To provide this capability, the printer includes a memory in which font data is stored. In essence, the font data comprises the information needed to convert a command from a computer, or the like, to print a particular character into the control signals necessary for the printer to print an image of the character in the designated font. Each different shape, or glyph, in the font is defined by a unique code word. To print a document, the computer identifies the font to be used, and then sends the code words for the successive characters.

The number of different fonts that can be printed, and the efficiency with which they are printed, is influenced by the amount of memory in the printer. Typically, the memory of the printer might be pre-loaded with a number of the most common fonts. When printing a document containing these fonts, the code words for the characters in the document are sent directly to the printer, where the prestored font information enables that data to be quickly converted into the appropriate printing signals.

It is sometimes desirable to print characters or symbols other than those contained in the fonts that are prestored in the printer. To accommodate this situation, a font can be downloaded to the printer, and stored in its memory, prior to the commencement of the printing operation itself. If more than one font is required for the document, each font can be downloaded into the memory, and the printer can switch between them as needed. If the size of the printer's memory is not sufficient to hold the data for all of the needed fonts, the printing operation might be halted, as a result of which the document is not printed.

Of course, the performance of the printing operation, particularly the ability to print a document with multiple fonts, can be enhanced by increasing the amount of memory in the printer. However, increased memory also results in a higher price for the printer, and therefore is not always feasible or desirable.

The problem of font management versus memory size is exacerbated in the case of fonts having large character sets. More particularly, many fonts associated with the Roman languages have a maximum of 256 glyphs, i.e. representable shapes. Thus, each glyph can be represented with a single byte of data. However, it may be desirable to print characters from a font which contains more than 256 glyphs. For example, the Chinese alphabet might contain up to 30,000 characters. To encode all of these characters in a font, two bytes of data per glyph are required. In the past, when a font having a large character set was encountered in the document, the entire document was converted into a bit-mapped image at the resolution of the printer, and then sent to the printer. The need to convert the text into a bit map significantly slows the printing operation, relative to the time required to print a document consisting of only 256-character fonts. Furthermore, the time required to convert the document into a bit-mapped image is directly related to the resolution of the printer, as a result of which higher resolution printers are most adversely affected by this process.

In an effort to avoid bit map conversions, an approach has been employed in which a font having a large character set is divided into two or more subfonts, each having a maximum of 256 characters. For example, the first subfont might consist of the first 256 characters in the original font, the next subfont might comprise the second set of 256 characters in the original font, and so on. As the document is printed, the printer switches between the different subfonts as needed to print the individual characters.

The need to switch between the fonts slows the overall printing process, and the management of the multiple subfonts can become complicated. Furthermore, this approach can only be used where the printer has sufficient memory to store all of the subfonts. If the memory is insufficient, such as in the case of fonts having extremely large character sets, for example those of the Asian languages, it is still necessary to convert the document into a bit-mapped image, or to halt the printing operation.

Accordingly, it is desirable to provide a more efficient approach to the management of fonts during an imaging process, particularly in connection with fonts having large character sets.

BRIEF STATEMENT OF THE INVENTION

In pursuit of the foregoing objective, the present invention provides for the dynamic management of fonts in accordance with the available memory on an imaging device, and the requirements of the document to be imaged. When an imaging operation, such as printing, commences, the document is examined to identify characters that are contained in the document. This examination inherently detects fonts appearing in the document as well. A database is constructed to store the fonts, and the characters within these fonts, that are identified.

Once the database is completed, the imaging device is checked to see if the required fonts are already stored in its memory. If so, the document data is sent to the device, to be imaged, e.g. printed. If one or more of the required fonts is not present in the device, the required characters for that font are remapped to a sparse font containing those characters that are needed for the document. If the device has sufficient available memory to store the sparse font, it is downloaded to the device, after which the document data is sent to the device for imaging. If, however, the device does not contain sufficient memory to store all of the sparse fonts that may be needed to image the document, the document is preferably converted into a bit-map, and then imaged.

Thus, the user is always assured that the document will be imaged in the most efficient manner that is consistent with the capabilities of the device. In those cases where the device contains sufficient memory, the necessary fonts are downloaded and imaging can be carried out rapidly. If the memory is insufficient for the requirements of the document, a slower method is automatically employed which assures imaging of the complete document.

These and other features of the invention, as well as the advantages offered thereby, are explained in greater detail hereinafter with reference to specific embodiments illustrated in the accompanying figures.

BRIEF DESCRIPTION OF THE DRAWINGS

FIG. 1 is a general block diagram of the overall configuration of a document printing system;

FIGS. 2a and 2b illustrate one example of the manner in which character data can be stored in a database;

DETAILED DESCRIPTION

Figure 3:
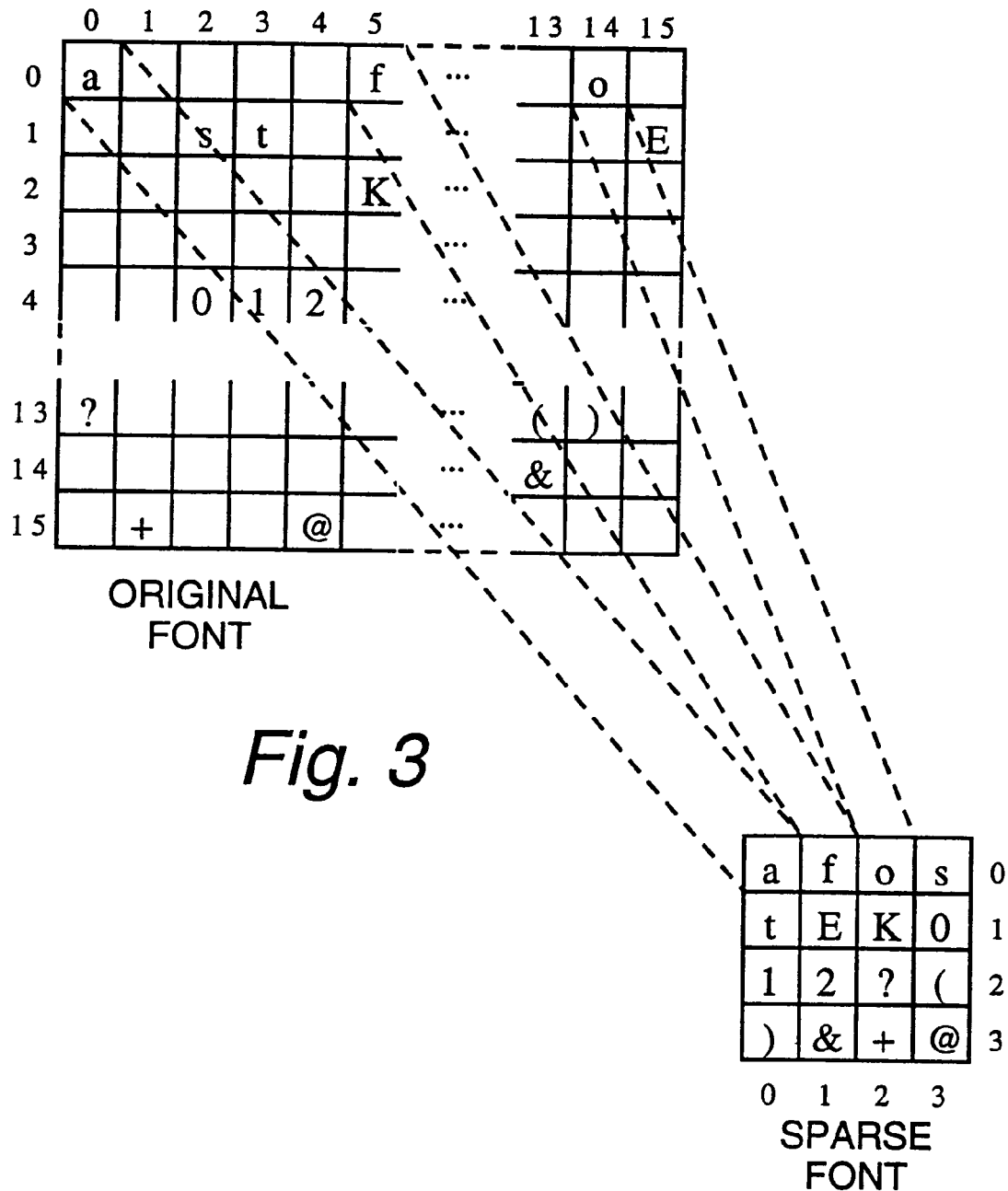
FIG. 3 illustrates the remapping of a large-character font into a smaller, sparse font.

To facilitate an understanding of the invention, it is explained hereinafter with reference to its implementation in a particular embodiment, wherein a document generated on a computer is sent to an external printer to be printed. Further in this regard, specific examples of printers and fonts are set forth. It will be appreciated, however, that the principles of the invention are not limited to the illustrated embodiments. Rather, they have general applicability to any type of environment in which it is desirable to employ large-character fonts where the amount of available memory on an imaging device may be limited.

FIG. 1 is a block diagram illustrating an exemplary type of imaging system in which the present invention might be employed. In this particular system, a document is generated on a computer 10, and sent to an external printer 12 in response to a print command generated by a user, or the like. In the computer, the document can be created with a word processing program, for example, and stored in a portion of the memory 14 of the computer. The memory 14 of the computer 10 may also contain font data which is used by the program that created the document, and defines the shapes of the individual characters in various fonts. In response to a print command, the computer's CPU 16 sends the document data 18 to a print spooler 20. The spooler processes the document data to create a file of commands that are sent to the printer to cause the document to be printed. These commands include the codes for the individual characters in the document, according to the respective fonts for those characters.

When the spooled document data is sent to the printer 12, it passes through a preprocessing stage 22, in which the commands from the computer 10 are converted into appropriate signals. These signals are provided to a print engine 24, which causes the desired image to be printed on a sheet of paper or other suitable medium. The preprocessing stage 22 utilizes data relating to the various fonts in the document to generate the control signals for the print engine. This data is stored in a memory 26 within the printer. Typically, printers are supplied to the consumer with font data pertaining to the most commonly used fonts. Since this data is persistent within the printer, it might be stored in a ROM or other suitable non-volatile memory device.

It may be the case that some of the fonts appearing within the document generated on the computer 10 are not stored in the font memory 26 of the printer 12. In this situation, the fonts can be downloaded from the computer 10 into a writable portion of the font memory 26, such as RAM. Generally, all of the appropriate fonts are downloaded to the printer before the actual printing of the document begins. However, if the size of the font memory 26 is not sufficient to store all of the fonts to be printed on the document, the downloading of the font data from the computer 10 to the printer's memory 26 can be carried out in an intermittent fashion, for example at the beginning of a page on which a new font is required. In this case, the new font is substituted for another font in the printer's memory.

In accordance with the present invention, at the time that the document data is being sent to the spooler 20, a decision is made whether to download font data to the printer 12, and if so which data to download. To this end, the characters in the document are examined to identify one or more fonts to which they relate and the glyphs, or shapes, that represent them. This examination can take place in parallel with the transmission of the data to the spooler 20, for example. When a new font and character is identified, an entry is made in a font database 28 stored within the memory 14 of the computer 10.

FIGS. 2a and 2b illustrate one example of the manner in which the font data can be stored in the database 28. FIG. 2a illustrates an example of a document that contains one font, e.g., Helvetica, on numbered pages 1 and 2, and a different font, such as Chicago, on numbered page 3. In this particular example, Helvetica is identified by a font reference value of 28, and Chicago has a font reference value of 37.

As the exemplary document is being sent to the spooler 20, the computer's graphics system obtains the font information for the document and stores the information in the form of tags, with one tag being assigned to each font. The data structure of the document font database 28 is comprised of a collection and a packed array of tag structures. Referring to FIG. 2b, the collection comprises a tag item and an identification item. The tag item is the reference value of the associated font. The identification item is the byte offset for the associated information in the font database packed array.

The packed array contains a merged string of glyph usage bits for each page, proceeded by an identification of the first page on which the font is used. In the example of FIG. 2b, since the Helvetica font is the first one to appear on the document, information relating to this font starts at byte 0 in the packed array. The stored information indicates the first page on which the font appears, in this case page 1, followed by data which identifies the font and the glyphs within the font that appear in the document. The next item in the packed array relates to the Chicago font appearing on page 3. This information begins at byte 78, and identifies the first page on which the font appears, and the glyphs within the Chicago font that appear in the document. Preferably, every font appearing in the document, as well as each glyph that is used, is stored in the database in this manner.

After the document has been spooled and the entries have been made in the document font database, the collection items are examined to determine the fonts that will be needed to print the document. Prior to sending the document data itself, the computer 10 communicates with the printer to determine which fonts are already stored in its memory 26. If all of the fonts needed for the document are present on the printer, the document data is sent from the spooler 20, and the printing process begins.

If one or more of the necessary fonts is not stored in the memory 26 of the printer, the font data is downloaded from the computer 10 to the printer 12. In accordance with the invention, all of the data relating to a particular font is not necessarily downloaded to the printer. Rather, a sparse font is created for transmission to the printer. A sparse font comprises a subset of all the characters in the original font. This subset is determined from the packed array stored in the database 28.

To illustrate, an original font might contain 3,000 characters, each of which has a unique encoding. Of the 3,000 characters, perhaps only 500 of them appear in the document. It is quite unlikely that the 500 characters will be grouped together within the font according to their codes. Rather, it is more likely that the codes for the 500 characters will be scattered throughout the 3,000 codes which comprise the original font encodings.

To create a sparse font, the 500 characters which actually appear in the document are used to define a new, 500- character sparse font. In the sparse font, the codes which identify the characters are consecutively numbered. FIG. 3 schematically illustrates the remapping of the characters to create a sparse font. The upper table of the figure illustrates the encoding of all of the characters in the original font. The numbers at the top of the table might be the values of the least significant byte, and those on the left side of the table might be the values of the most significant byte, for example. As can be seen, the code values for the characters which actually appear in the document are distributed throughout the totality of the original codes for the font.

The sparse font relating to the used characters is illustrated in the lower table of FIG. 3. In essence, the characters in the original font that appear in the document are respectively mapped to new code values, as depicted in the lower table of FIG. 3. Since the sparse font contains only 500 characters with consecutive code values, it requires significantly less memory to store it. For example, while the full character set of the font may require one half megabyte to store all of the font data, the sparse font might require less than 100,000 bytes of memory.

If the sparse font contains 256 characters or less, all of its elements can be encoded with a single byte of data, and therefore be stored in the memory of the printer in the same manner as a conventional 256-character font. If the sparse font contains more than 256 characters, as in the example described above, its elements are encoded with two bytes of data. Within the sparse font, the characters can be grouped into segments of 256 elements. The first byte of the encoding identifies the particular segment to which a character belongs, and the second byte identifies the character within the segment. Unlike prior font management systems, the printer is not required to switch between different 256-character fonts. Rather, all of the characters are members of a single two-byte font. Since many commercially available printers are capable of handling two-byte fonts, such as those which support the PostScript® Page Description Language, this approach avoids the need to switch between fonts when large character sets are involved, thereby expediting the printing process.

For each font which appears in the document but is not stored in the printer, a similar remapping to a sparse set is carried out. After all of the sparse fonts have been generated, the amount of memory necessary to store them is determined, and the printer is interrogated to see if it has that much memory available. If so, the sparse fonts are downloaded to the printer's memory 26. With this arrangement, all of the necessary fonts are available in the printer, and printing can be carried out most efficiently.

Subsequently, as the document is to be printed, each character in a downloaded font is converted to its sparse font code value in the computer 10, according to the mapping depicted in FIG. 3. This new encoding is then sent to the printer as the command to print the particular character.

If the printer does not have a large amount of memory, and the document contains a significant number of glyphs from fonts that are not stored in the printer, it may turn out that it is not possible to download all of the fonts that will be necessary for printing. In such a case, however, the printing process is not halted. Rather, in accordance with a preferred embodiment of the present invention, printing is still carried out. To this end, once a determination is made that the printer does not have sufficient memory to store all of the necessary font information, the document is converted into a bit-mapped image within the computer 10. The bit-mapped data can then be serially transmitted to the printer, to enable the complete document to be printed.

Figure 4:
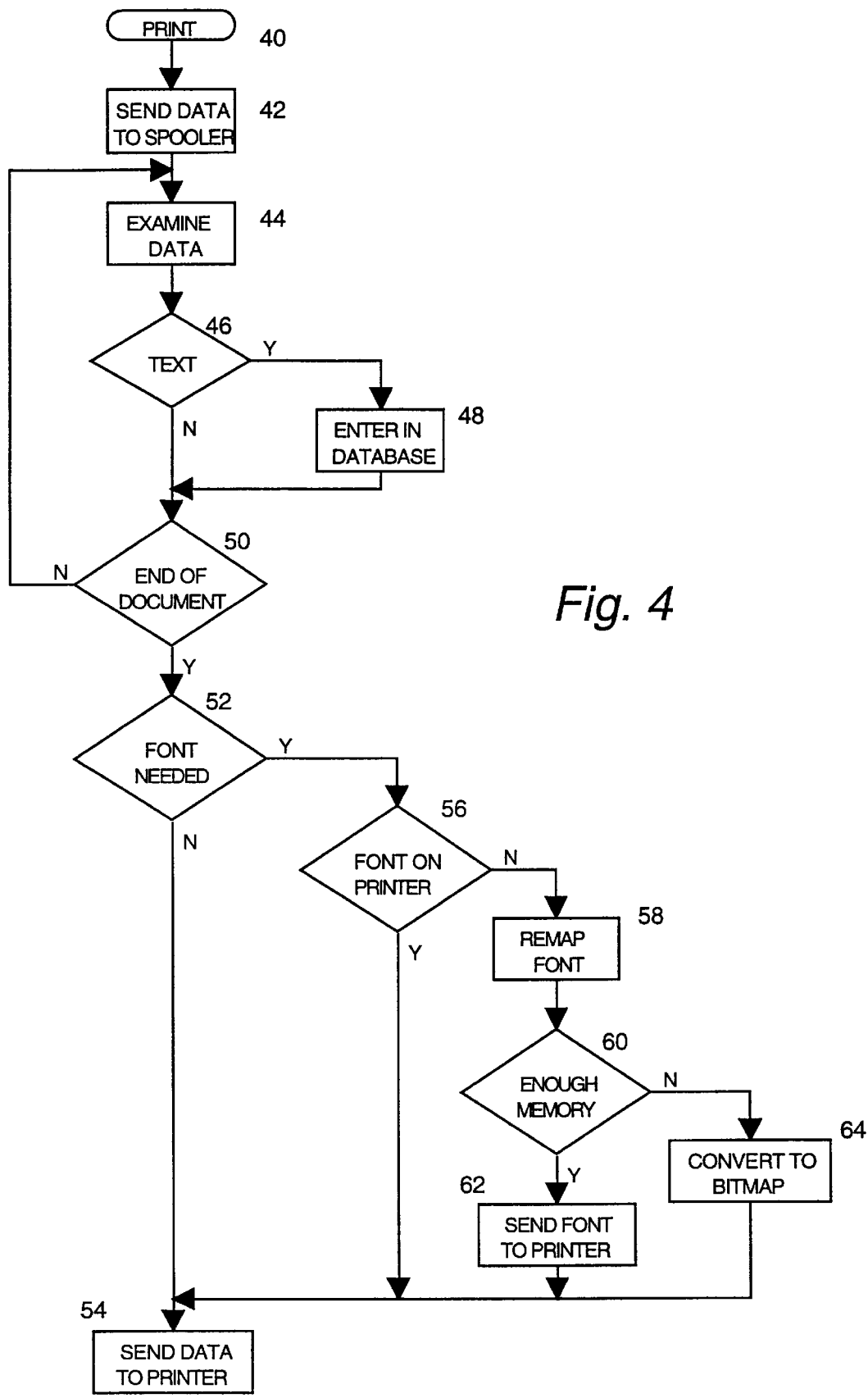
FIG. 4 is flow chart illustrating the procedure that is carried out in an embodiment of the present invention.

The overall procedure that is carried out in accordance with the preferred embodiment of the present invention is illustrated in the flow chart of FIG. 4. Referring thereto, in response to the generation of a print command at step 40, the computer begins to pass the document data to the print spooler, at step 42. As the document data is passed to the spooler, it is also examined at step 44 to determine whether it contains text information. If an element of text is detected, at step 46, the appropriate data is entered in the database 28, at step 48. This process continues until the end of the document is reached, at step 50.

Thereafter, at step 52, the database is examined to determine whether any fonts are needed for printing the document. If the document is strictly a graphic image, for example, and does not contain any textual data, no fonts will be needed to print it, and so the document data can be sent directly to the printer, at step 54. However, if a determination is made at step 52 that a font is needed, the printer is queried at step 56 to determine whether it already has the font data. If so, the document data is sent to the printer at step 52. However, if the font is not present on the printer, it is remapped into a sparse font at step 58. A determination is then made at step 60 whether the printer has sufficient memory available to store the sparse font. If so, the font is sent to the printer at step 62, followed by the document data. However, if the printer does not contain sufficient memory, the document is converted to a bit-mapped image at step 64, which is then printed.

In the example of FIG. 4, the font is first converted to a sparse font, so that a determination can be made whether the printer has sufficient memory to store it. However, it may be the case that a priori knowledge about the font makes it possible to determine whether the printer has the ability to store a sparse font before it is remapped. In such a case, the remapping process can be avoided in those situations where the printer's memory is not sufficient.

From the foregoing, it can be seen that the present invention provides for dynamic management of fonts in a manner which accommodates the available memory on the imaging device, relative to the requirements of the document to be imaged. In the worst case, the imaging takes place at a rate which is no slower than that encountered in heretofore conventional devices. Whenever possible, however, the required font data is downloaded to the imaging device so that imaging can be carried out in the most efficient manner. To minimize memory requirements, downloaded fonts are preferably remapped into a sparse font, so that the device memory is not occupied with unnecessary font data. If sufficient memory is not available, the imaging process is not halted. Rather, to ensure imaging of the complete document, its data is converted into a bit map, which can be reliably imaged. With this approach, documents which contain characters from fonts with large character sets, especially those with two-byte encodings, can be imaged in the most efficient manner.

Although the present invention has been described in connection with preferred embodiments thereof, it will be appreciated by those skilled in the art that additions, deletions, modifications, and substitutions not specifically described may be made without departing from the spirit and scope of the invention, as defined in the appended claims. For example, while specifically described in the context of printing, the principles of the invention are applicable to any type of imaging device in which font data is stored in a memory and used in the imaging process.

I claim:

1. A method for managing fonts appearing in a document to be imaged, comprising the steps of:

detecting fonts in a document to be imaged;

determining whether the detected fonts are available on an imaging device;

transmitting the document to the imaging device if each detected font is available on the imaging device;

forming one or more sparse font sets if not every detected font is available on the imaging device, wherein each formed sparse font set consists of a subset of characters of an unavailable font;

determining whether the imaging device has sufficient capacity to store the formed sparse font sets;

storing the sparse font sets in the imaging device and transmitting the document to the imaging device if the device has sufficient capacity; and converting the document to a non-character based format and transmitting the non-character based format to the imaging device if the device is determined not to have sufficient capacity.

2. The method of claim 1 wherein the formation of a sparse font set comprises the steps of:

identifying each glyph that appears in the document for one of the detected fonts; and assigning a code value to each of the identified glyphs, such that the code values assigned to all of the identified glyphs comprise a consecutive sequence of values.

3. The method of claim 1 wherein the formation of a sparse font set comprises the steps of:

detecting each glyph in the document for a given font;

identifying a code value associated with each detected glyph; and mapping all of the identified code values to a new set of consecutive code values, wherein the number of code values in the new set is equal to the number of identified code values.

4. The method of claim 1 wherein the non-character based format is a bit-mapped image.

5. A method for managing the printing of a document on a printer, comprising the steps of:

identifying glyphs in fonts which appear in the document;

determining whether fonts appearing in the document are available on the printer;

if every font appearing in the document is available on the printer, transmitting the document to the printer;

if not every font is available on the printer, determining whether the printer has capacity to store data relating to the identified glyphs for the fonts;

storing data for the identified glyphs in the printer and transmitting the document to the printer if the printer has said capacity;

converting the document into a non-character based format and transmitting the non-character based format to the printer if the printer does not have said capacity; and printing the document.

6. The method of claim 5 wherein said non-character based format is a bit-mapped image.

7. The method of claim 5 wherein said storing step includes the steps of mapping the identified glyphs for a font to a set of consecutive code values, and storing data relating to each identified glyph in said printer in accordance with its mapped code value.

8. A document imaging system, comprising:

means for detecting glyphs in fonts which appear in a document to be imaged;

a memory storing a database of the detected glyphs;

an imaging device having a memory;

means for determining whether fonts appearing in the document are available on the imaging device;

means for transmitting the document to the imaging device if the determination is affirmative;

means for determining, if the determination is negative, whether the memory of the device can store data relating to the detected glyphs stored in said database;

means for storing data relating to the detected glyphs in the memory of the device and for transmitting the document to the device if the memory of the device can store the glyph related data; and means for converting the document into a noncharacter based image format and for transmitting the noncharacter based image format to the device if the memory of the device cannot store the glyph related data.

9. The document imaging system of claim 8, wherein said image format is a bit-mapped image.

10. The document imaging system of claim 8, further comprising means for mapping detected glyphs of a particular font appearing in the document to a sparse font consisting of a subset of characters of the particular font, wherein a coding format of said sparse font is consistent with a coding format of fonts used by the device.

11. A document imaging system, comprising:

means for detecting glyphs in fonts which appear in a document to be imaged;

a memory storing a database of the detected glyphs;

an imaging device having a memory;

means for determining whether fonts appearing in the document are available on the imaging device;

means for transmitting the document to the imaging device if the determination is affirmative;

means for determining, if the determination is negative, whether the memory of the device can store data relating to the detected glyphs stored in said database;

means for mapping detected glyphs of a particular font appearing in the document to a sparse font consisting of a subset of characters of the particular font;

for storing said sparse font in the memory of the device and for transmitting document defining data to said device if the memory of the device is sufficient to store the glyph related data; and means for converting the document defining data to a non-character based format and for transmitting the non-character based format to said device if the memory of the device is insufficient to store the glyph related data.

12. The method of claim 1, comprising the additional steps of:

determining a number of characters in said sparse font;

assigning a one-byte code to each character in said sparse font if said number is less than or equal to 256; and assigning a two-byte code to each character in said sparse font if said number is greater than 256.

13. The method of claim 12, wherein a first byte of said two-byte code indicates which of a plurality of sections of said sparse font includes a particular character.

14. The method of claim 5, comprising the additional step of constructing a reduced-size font set including a subset of glyphs of a particular font which appear in the document, wherein a coding format of said reduced-size font set is consistent with a coding format of fonts used by the printer.

15. The method of claim 5, comprising the additional steps of:

determining a number of characters in said sparse font;

assigning a one-byte code to each character in said sparse font if said number is less than or equal to 256; and assigning a two-byte code to each character in said sparse font if said number is greater than 256.

16. The method of claim 15, wherein a first byte of said two-byte code indicates which of a plurality of sections of said sparse font includes a particular character.

17. The system of claim 8, further comprising:

means for determining a number of characters in said sparse font;

means for assigning a one-byte code to each character in said sparse font if said number is less than or equal to 256; and means for assigning a two-byte code to each character in said sparse font if said number is greater than 256.

18. The system of claim 17, wherein a first byte of said two-byte code indicates which of a plurality of sections of said sparse font includes a particular character.

19. The system of claim 11, further comprising:

means for determining a number of characters in said sparse font;

means for assigning a one-byte code to each character in said sparse font if said number is less than or equal to 256; and means for assigning a two-byte code to each character in said sparse font if said number is greater than 256.

20. The system of claim 19, wherein a first byte of said two-byte code indicates which of a plurality of sections of said sparse font includes a particular character.

21. A method for managing fonts appearing in a document to be imaged, comprising the steps of:

examining the document and constructing a font data base including a list of fonts appearing in the document and glyph information for characters appearing in the document;

determining whether the listed fonts are available on an imaging device;

transmitting the document to the imaging device if the determination is affirmative;

forming, if the determination is negative, a sparse font set from a listed font which is not available on the device, wherein said sparse font set consists of a subset of characters of said unavailable listed font;

determining whether the device has sufficient capacity to store said sparse font set;

storing said sparse font set in the device and transmitting the document to the device if the device has sufficient capacity; and converting the document to a non-character based format and transmitting the non-character based format to the device if the device does not have sufficient capacity.

22. The method of claim 21, wherein said font data base includes a collection of tag elements, each element corresponding to a font appearing in the document, and a packed array of tag structures, each tag structure including a string of glyph usage bits for a page of the document.

23. The method of claim 22, wherein each of said tag elements includes a reference value for a particular font appearing in the document and a corresponding identification item indicating a byte offset within said packed array for information relating to the particular font.

24. The method of claim 21, comprising the additional steps of:

determining a number of characters in said sparse font;

assigning a one-byte code to each character in said sparse font if said number is less than or equal to 256; and assigning a two-byte code to each character in said sparse font if said number is greater than 256.

25. The method of claim 24, wherein a first byte of said two-byte code indicates which of a plurality of sections of said sparse font includes a particular character.

26. The method of claim 1, wherein the coding format of the sparse font set is identical to said particular coding format, and wherein a manner in which the imaging device accesses and utilizes the sparse font set is identical to a manner in which the imaging device accesses and utilizes other available fonts.

27. The method of claim 26, wherein the other available fonts include pre-loaded non-sparse fonts and downloaded non-sparse fonts.

28. The method of claim 11, wherein the coding format of the sparse font set is identical to said particular coding format, and wherein a manner in which the imaging device accesses and utilizes the sparse font set is identical to a manner in which the imaging device accesses and utilizes other available fonts.

29. The method of claim 28, wherein the other available fonts include pre-loaded non-sparse fonts and downloaded non-sparse fonts.

30. The method of claim 21, wherein the coding format of the sparse font set is identical to said particular coding format, and wherein a manner in which the imaging device accesses and utilizes the sparse font set is identical to a manner in which the imaging device accesses and utilizes other available fonts.

31. The method of claim 30, wherein the other available fonts include pre-loaded non-sparse fonts and downloaded non-sparse fonts.

\* \* \* \* \*

UNITED STATES PATENT AND TRADEMARK OFFICE
CERTIFICATE OF CORRECTION

PATENT NO.   : 5,940,581
DATED        : August 17, 1999
INVENTOR(S)  : Daniel I. Lipton It is certified that error appears in the above-identified patent and that said Letters Patent is hereby corrected as shown below:

Column 8,
Line 41, after the word "font", delete the semi-colon " ; ", insert a comma -- , --; and
Lines 41 and 42, remove the hard return immediately following the comma (,) on Line 41.

Signed and Sealed this

Eighth Day of January, 2002

Attest:

Attesting Officer

JAMES E. ROGAN
Director of the United States Patent and Trademark Office